(12) United States Patent
Shestak et al.

(10) Patent No.: US 10,733,484 B2
(45) Date of Patent: Aug. 4, 2020

(54) METHOD, APPARATUS, AND SYSTEM FOR DYNAMIC ADAPTATION OF AN IN-VEHICLE FEATURE DETECTOR

(71) Applicant: HERE GLOBAL B.V., Eindhoven (NL)

(72) Inventors: Vladimir Shestak, Chicago, IL (US); Stephen O'Hara, Chicago, IL (US); Nicholas Dronen, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 317 days.

(21) Appl. No.: 15/933,063

(22) Filed: Mar. 22, 2018

(65) Prior Publication Data
US 2019/0294934 A1    Sep. 26, 2019

(51) Int. Cl.
*G06K 9/00* (2006.01)
*G06K 9/66* (2006.01)
*G06N 20/00* (2019.01)
*B60W 30/08* (2012.01)
*H04L 29/08* (2006.01)

(52) U.S. Cl.
CPC ........... *G06K 9/66* (2013.01); *G06K 9/00791* (2013.01); *G06K 9/00798* (2013.01); *B60W 30/08* (2013.01); *B60W 2420/42* (2013.01); *B60W 2552/00* (2020.02); *G06N 20/00* (2019.01); *H04L 67/12* (2013.01)

(58) Field of Classification Search
CPC .. G06K 9/66; G06K 9/00791; G06K 9/00798; G06N 20/00; B60W 2552/00; B60W 30/08; B60W 2420/42; H04L 67/12
USPC ...................................................... 382/156
See application file for complete search history.

(56) References Cited

U.S. PATENT DOCUMENTS

| | | | |
|---|---|---|---|
| 8,643,721 B2 | 2/2014 | Becker | |
| 9,367,811 B2 | 6/2016 | Ramachandran et al. | |
| (Continued) | | | |

FOREIGN PATENT DOCUMENTS

| | | |
|---|---|---|
| WO | 2012091814 A2 | 7/2012 |
| WO | 2014032660 A1 | 3/2014 |
| WO | 2017074966 A1 | 5/2017 |

OTHER PUBLICATIONS

Office Action for corresponding European Patent Application No. 19164558.9-1207, dated Jul. 30, 2019, 7 pages.

*Primary Examiner* — Jonathan S Lee
(74) *Attorney, Agent, or Firm* — Ditthavong & Steiner, P.C.

(57) ABSTRACT

An approach is provided for dynamic adaptation of an in-vehicle feature detector. The approach involves embedding a feature detection model, precomputed weights for the feature detection model, or a combination thereof in a data layer of map data representing a geographic area from which a training data set was collected to generate the feature detection model, the precomputed weights, or a combination thereof. The approach also involves deploying the feature detection model, the precomputed weights, or a combination thereof to adapt an in-vehicle feature detector based on determining that the in-vehicle feature detector is in the geographic area, plans to travel in the geographic area, or a combination thereof. The in-vehicle feature detector can then use the feature detection model, the precomputed weights, or a combination thereof to process sensor data collected while in the geographic area to detect one or more features.

20 Claims, 12 Drawing Sheets

(56) References Cited

U.S. PATENT DOCUMENTS

| | | | | |
|---|---|---|---|---|
| 9,639,346 B2* | 5/2017 | Tuukkanen | ............... | G06F 8/65 |
| 9,928,432 B1* | 3/2018 | Sathyanarayana | ..... | H04N 5/247 |
| 10,209,974 B1* | 2/2019 | Patton | .................... | G06N 20/00 |

* cited by examiner

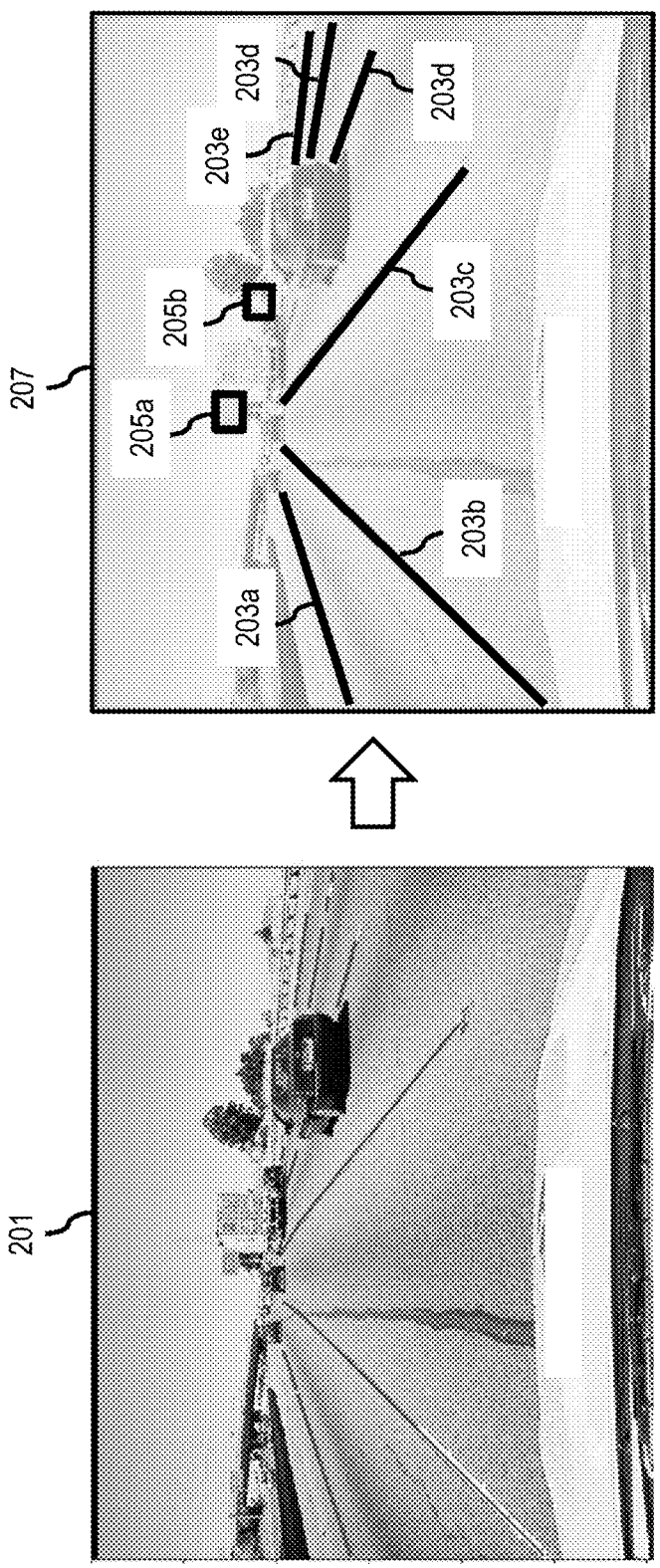

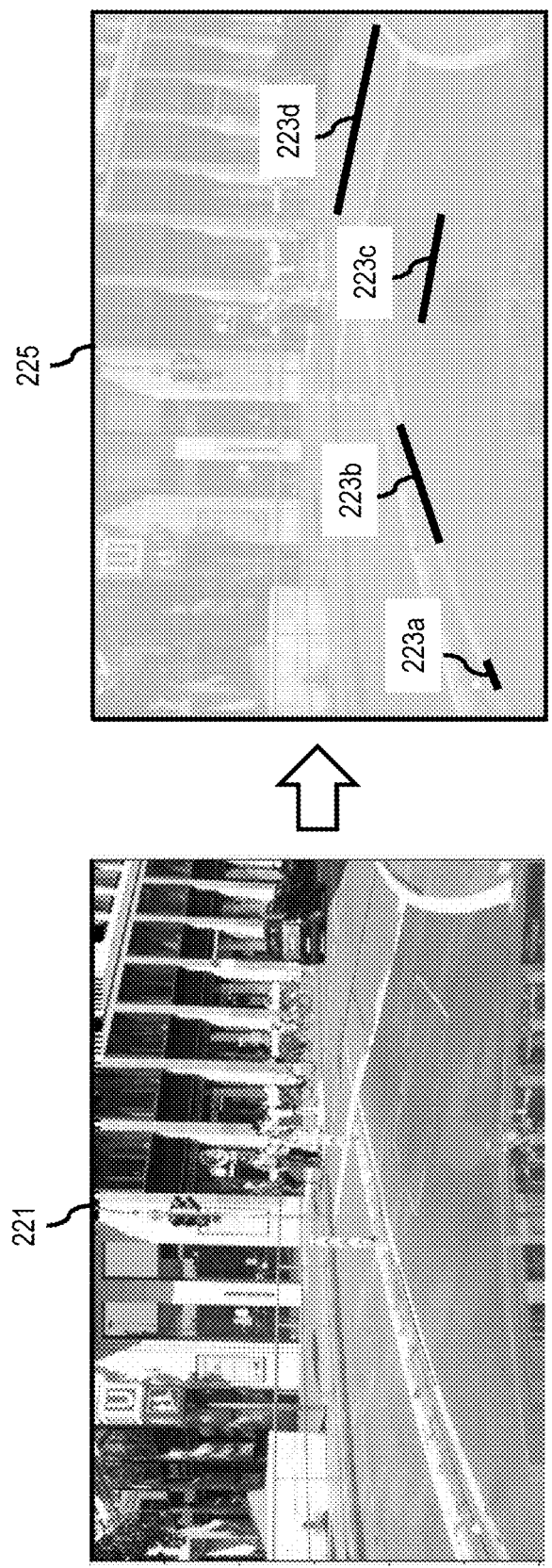

METHOD, APPARATUS, AND SYSTEM FOR DYNAMIC ADAPTATION OF AN IN-VEHICLE FEATURE DETECTOR

BACKGROUND

Advances in computer vision systems and feature detectors (e.g., machine learning based feature detectors such as neural networks) are leading to accelerated development of autonomous driving and related mapping/navigation services. However, feature detectors traditionally require significant computing resources to implement, with resource requirements increasing further as the number and variety of detectable features increase. Accordingly, service providers and vehicle manufacturers face significant technical challenges to providing in-vehicle feature detectors that balance feature detection performance and capability against the typically resource-constrained environment of in-vehicle embedded systems.

SOME EXAMPLE EMBODIMENTS

Therefore, there is a need for an approach for dynamic adaptation of an in-vehicle feature detector to provide increased accuracy, speed, and/or generality.

According to one embodiment, a computer-implemented method comprises generating a map layer for one or more map tiles of a tile-based geographic database. The map layer stores a feature detection model, precomputed weights for the feature detection model, or a combination thereof respectively for the one or more map tiles. The feature detection model, the precomputed weights, or a combination thereof are generated from a training data set respectively from the one or more map tiles. In addition, the feature detection model, the precomputed weights, or a combination thereof are dynamically deployed to an in-vehicle feature detector in response to a location-based request for the one or more map tiles.

According to another embodiment, an apparatus comprises at least one processor, and at least one memory including computer program code for one or more computer programs, the at least one memory and the computer program code configured to, with the at least one processor, cause, at least in part, the apparatus to generate a map layer for one or more map tiles of a tile-based geographic database. The map layer stores a feature detection model, precomputed weights for the feature detection model, or a combination thereof respectively for the one or more map tiles. The feature detection model, the precomputed weights, or a combination thereof are generated from a training data set respectively from the one or more map tiles. In addition, the feature detection model, the precomputed weights, or a combination thereof are dynamically deployed to an in-vehicle feature detector in response to a location-based request for the one or more map tiles.

According to another embodiment, a non-transitory computer-readable storage medium carries one or more sequences of one or more instructions which, when executed by one or more processors, cause, at least in part, an apparatus to generate a map layer for one or more map tiles of a tile-based geographic database. The map layer stores a feature detection model, precomputed weights for the feature detection model, or a combination thereof respectively for the one or more map tiles. The feature detection model, the precomputed weights, or a combination thereof are generated from a training data set respectively from the one or more map tiles. In addition, the feature detection model, the precomputed weights, or a combination thereof are dynamically deployed to an in-vehicle feature detector in response to a location-based request for the one or more map tiles.

According to another embodiment, an apparatus comprises means for generating a map layer for one or more map tiles of a tile-based geographic database. The map layer stores a feature detection model, precomputed weights for the feature detection model, or a combination thereof respectively for the one or more map tiles. The feature detection model, the precomputed weights, or a combination thereof are generated from a training data set respectively from the one or more map tiles. In addition, the feature detection model, the precomputed weights, or a combination thereof are dynamically deployed to an in-vehicle feature detector in response to a location-based request for the one or more map tiles.

According to another embodiment, a computer-implemented method comprises retrieving a map tile from a geographic database. The map tile includes a data layer storing a feature detection model, precomputed weights for the feature detection model, or a combination thereof. The feature detection model, the precomputed weights, or a combination thereof are generated using a training data set collected from a geographic area represented by the map tile. The method also comprises adapting an in-vehicle feature detector with the feature detection model, the precomputed weights, or a combination thereof based on determining that the in-vehicle feature detector is in or expected to be in the geographic area. The adapted in-vehicle feature detector is then used to process sensor data collected from the geographic area to detect one or more features.

According to another embodiment, an apparatus comprises at least one processor, and at least one memory including computer program code for one or more computer programs, the at least one memory and the computer program code configured to, with the at least one processor, cause, at least in part, the apparatus to retrieve a map tile from a geographic database. The map tile includes a data layer storing a feature detection model, precomputed weights for the feature detection model, or a combination thereof. The feature detection model, the precomputed weights, or a combination thereof are generated using a training data set collected from a geographic area represented by the map tile. The apparatus is also caused to adapt an in-vehicle feature detector with the feature detection model, the precomputed weights, or a combination thereof based on determining that the in-vehicle feature detector is in or expected to be in the geographic area. The adapted in-vehicle feature detector is then used to process sensor data collected from the geographic area to detect one or more features.

According to another embodiment, a non-transitory computer-readable storage medium carries one or more sequences of one or more instructions which, when executed by one or more processors, cause, at least in part, an apparatus to retrieve a map tile from a geographic database. The map tile includes a data layer storing a feature detection model, precomputed weights for the feature detection model, or a combination thereof. The feature detection model, the precomputed weights, or a combination thereof are generated using a training data set collected from a geographic area represented by the map tile. The apparatus is also caused to adapt an in-vehicle feature detector with the feature detection model, the precomputed weights, or a combination thereof based on determining that the in-vehicle feature detector is in or expected to be in the geographic area. The adapted in-vehicle feature detector is then used to process sensor data collected from the geographic area to detect one or more features.

According to another embodiment, an apparatus comprises means for retrieving a map tile from a geographic database. The map tile includes a data layer storing a feature detection model, precomputed weights for the feature detection model, or a combination thereof. The feature detection model, the precomputed weights, or a combination thereof are generated using a training data set collected from a geographic area represented by the map tile. The apparatus also comprises means for adapting an in-vehicle feature detector with the feature detection model, the precomputed weights, or a combination thereof based on determining that the in-vehicle feature detector is in or expected to be in the geographic area. The adapted in-vehicle feature detector is then used to process sensor data collected from the geographic area to detect one or more features.

According to another embodiment, a computer-implemented method comprises embedding a feature detection model, precomputed weights for the feature detection model, or a combination thereof in a data layer of map data representing a geographic area from which a training data set was collected to generate the feature detection model, the precomputed weights, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A and 2B are diagrams illustrating two different geographic areas for in-vehicle feature detection, according to one embodiment;

DESCRIPTION OF SOME EMBODIMENTS

Examples of a method, apparatus, and computer program for dynamic adaptation of an in-vehicle feature detector are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
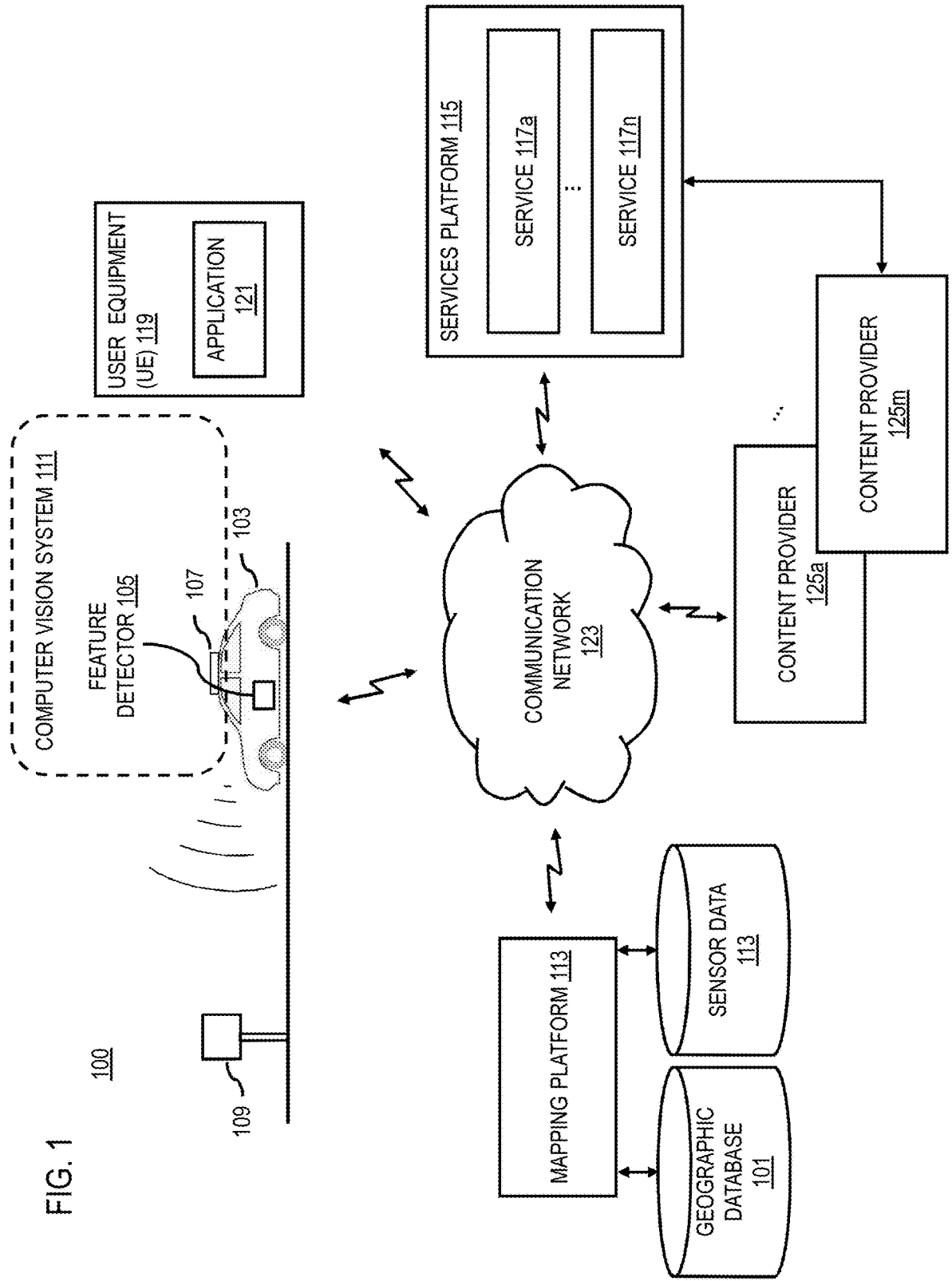
FIG. 1 is a diagram of a system capable of dynamic adaptation of an in-vehicle feature detector, according to one embodiment.

FIG. 1 is a diagram of a system capable of dynamic adaptation of an in-vehicle feature detector, according to one embodiment. One of the major components of self-driving functionality in the modern automotive industry is high-definition (HD) maps (e.g., such as the HD map data stored in a geographic database 101 as shown in FIG. 1). These HD maps allow highly automated vehicles (e.g., a vehicle 103) to precisely localize themselves on the road, e.g., by using in-vehicle feature detectors 105 to process sensor data collected by on-board sensors 107 to detect road objects 109 or other road features previously mapped and included in the HD map data to perform visual odometry.

However, visual odometry typically requires that HD maps provide at least centimeter-level mapping accuracy to ensure safe operation of autonomous, semi-autonomous, or highly-assisted driving (HAD) vehicles 103. By way of example, in order to map roads at 10-to-20 centimeter accuracy, map service providers (e.g., operating a mapping platform 113) can use advanced sensors (e.g., LiDAR technology) to collect billions of three-dimensional (3D) points and model road surfaces down to the number of lanes and their width. In this way, HD maps capture important details such as the slope and curvature of the road, lane markings and roadside objects such as sign posts, including what that signage denotes. For example, intelligent vehicles 103 (e.g., vehicles 103 with in-vehicle feature detectors 105) with sensors 107 (e.g., cameras, radar, LiDAR, etc.) capture sensor data as they drive in a road network, and can transmit the data to the mapping platform 113 (e.g., a cloud-based mapping service). In one embodiment, the transmitted data can include output from the in-vehicle feature detectors 105 that identifies potential features and/or objects identified in the sensor data that can be used by the mapping platform 113 can generate HD maps.

As a result, the data collection stage in the HD map building process can be heavily relying upon in-vehicle feature detectors 105. Traditional, in-vehicle feature detectors 105 are mainly based on computer vision neural network technologies that have been under active development for over the last 20 years. For example, the topology of deep convolutional networks can be represented by multiple layers of interconnected processing elements. These layers generally require significant compute power and memory allocation. In addition, extending the number of features (e.g., detection classes) that can be detected by a feature detector 105 typically requires more capacity from the underlying deep neural network. Given that embedded processors installed in vehicles are limited in computational capacity (e.g., as minimized for low power consumption, thermal dissipation, cost, etc.), it becomes clear that deployed in-vehicle feature detectors 105 will often have a trade-off between quality of detections, speed/throughput, and generality against available compute power and memory allocations.

Stated another way, given a fixed computational budget and other constraints, a traditional in-vehicle feature detector 105 can be built as either (1) a specialized neural network that has good quality under a specific or limited set of operational conditions and locales, or (2) a general-purpose model that will have lower quality but more consistent performance across varying conditions and locales. Therefore, providing a feature detection system that provides specificity across a broad range of locales and/or operational conditions within a resource-constrained compute environment presents significant technical challenges.

Current and next-generation vehicles 103 are examples of such compute resource-constrained environments. For example, many current and next-generation vehicles 103 with advanced driver-assistance systems (ADAS) technology (e.g., autonomous, semi-autonomous, and HAD vehicles 103) use "smart camera" systems that have embedded computing units available for deploying feature detection algorithms or models (e.g., in-vehicle feature detectors 105). A representative embedded computing device used in in-vehicle feature detectors 105 may currently be limited to 1,000 MFLOPS (MFLOPS=million floating point operations per second). Contemporary efficient deep neural networks may need 2 billion operations for a single inference (e.g., processing a single image or sensor observation). As a result, in order to process images from the camera's video stream at 10 frames per second (e.g., or other sensor data stream), the in-vehicle feature detector 105 would require 20,000 MFLOPS or 20× the computational capacity of this example computing device. A higher-capacity computing device may be employed for in-vehicle feature detectors 105 in next-generation vehicles, but there would still be limits with respect to what can be computed within a few watts of power that can be budgeted for a vehicle's computer vision system (e.g., including the in-vehicle feature detector 105).

One traditional approach to addressing this technical problem includes building region-specific feature detection models for the in-vehicle feature detector 105. For example, a feature detection model specialized for a specific geographic region can be developed using a much smaller neural network than a model which has the same detection accuracy but works equally well in any geographic region. However, region-specific feature detection models have limitations as shown in the examples of FIGS. 2A and 2B.

In the examples of FIGS. 2A and 2B, a vehicle 103 includes an in-vehicle feature detector 105 that uses a region-specific feature detection model trained using sensor data (e.g., imagery data) collected from California to improve feature detections in California. FIG. 2A illustrates an image 201 captured by a camera sensor 107 of the vehicle 103. The in-vehicle feature detector 105 performs well when applied to imagery of a California highway (e.g., the image 201) and is able to detect features such as lane lines 203a-203e and signs 205a-205b shown in the feature detection output 207. However, the region-specific feature model fails on an image 221 of FIG. 2B captured on an urban road in Germany, and detects only fragmented lines 223a-223d that do not accurately represent the actual lane lines of the German road. The failure occurred because the in-vehicle feature detector 105 is using a feature detection model or model parameters (e.g., model interconnection weights) that was mainly trained on California highway drives.

One traditional way to address the problem would be to add samples from German urban areas to the training set used to create this region-specific feature detection model. However, such an approach would require using a higher-capacity neural network to achieve the desired quality in both regions. To achieve good quality results over all geographic regions where this particular vehicle is expected to operate would require a deep network too large to be deployed to a low-power computing device used for in-vehicle feature detectors 105. Moreover, traditional processes to update feature detection models in vehicles are often complex, e.g., requiring, firmware or software updates of embedded systems that have to be installed by vehicle dealers or other equivalent means.

To address these technical problems, a system 100 of FIG. 1 introduces a capability to maximize feature detection quality when an in-vehicle feature detector 105 is implemented using a computing device with a fixed set of computational resource constraints. In one embodiment, the system 100 creates different sets of specialized feature detection models or different sets of parameters for those models. These specialized detections models or sets of parameters (e.g., model weights) are specific to delineated geographic areas to produce less resource intensive feature detection models that can function within the fixed set of computational resource constraints of the in-vehicle feature detector. The system 100 then uses the best feature detection model or model parameters from this set to adapt an in-vehicle feature detector 105 given the location and/or operational conditions (e.g., day/night, weather, time, visibility, etc.) at the time the feature detector 105 is being used. In one embodiment, the specialized feature detection models or model parameters are embedded in map data corresponding to the geographic area (e.g., a map tile encompassing the geographic area) to which the specialized feature detection models are best suited. In this way, the specialized feature detection models or model parameters can be deployed to the in-vehicle feature detector 105 based on delivery of the corresponding of the map data or map tile to the computer vision system 111 or other navigation/mapping service or application of the vehicle 103 (e.g., a navigation system, UE 119, or other device or component associated with the vehicle 103).

In other words, the system 100 makes it possible to dynamically adapt in-vehicle feature detectors 105 to changing locations and/or operational conditions by installing a new set of model parameters (e.g., weights) and/or new feature detection models as needed. For example, with respect to feature detection models based on neural networks or equivalent, weights are calculated for deep neural networks during training. Training process can be quite lengthy, computationally intensive, and therefore, is usually executed offline by the mapping platform 113. However, if computation resources, bandwidth, etc. are available to perform the training process with low latency, the mapping platform 113 can perform all or a portion of the training in an online (e.g., real-time or near real-time) mode. By way of example, most feature detectors 105 used in computer vision systems 111 are based on supervised learning models, and often require a large collection of annotated images or other similar sensor data for training (generally referred to as training data sets).

In one embodiment, the system 100 trains specialized or region-specific feature detection models or derives the parameters to use for those models for individual map tiles of HD maps (e.g., the geographic database 101) that are organized according to a tile-based structure. In this way, a prior knowledge of the geolocation of a map tile, would allow for tailoring of individual training sets to region-specific landscape, urban areas, road marking, signage, etc. present in the geographic areas of each map tile. This tailoring can advantageously increase the specificity of the resulting feature detection model while minimizing the computation resource requirements of the model (e.g., by reducing model size or complexity by reducing a need to maintaining the same prediction accuracy over a wider variety of input data, or eliminating detection classes or features not likely to be applicable to a given map tile area). In addition, different sets of weights or models can be precomputed to address various operational conditions in each map tile, e.g., day/night, weather, time of the year, etc.

Figure 3:
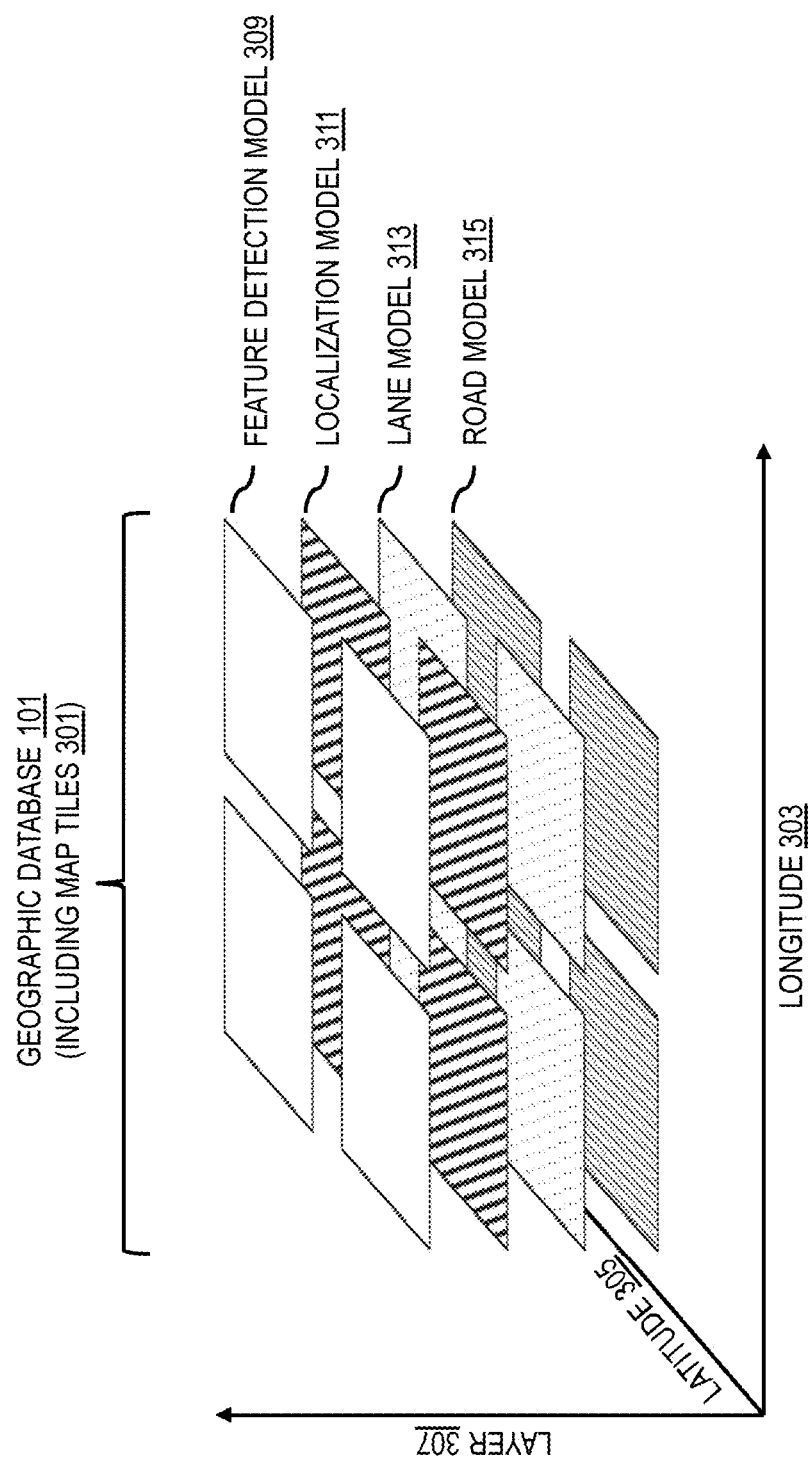
FIG. 3 is a diagram of data layers of a tile-based geographic database for dynamic adaptation of an in-vehicle feature detector, according to one embodiment.

In one embodiment, the system stores or embeds tile-specific feature detection models or precomputed per-tile sets of model weights/parameters in a designated data layer of the geographic database 101 or other equivalent map data as shown in FIG. 3. In the example of FIG. 3, the geographic database 101 is organized into a tile-based structure consisting of map tiles 301 that represent respective portions or a mapped area. The area of each map tile 301 is delineated by geographic coordinates along a longitude coordinate axis 303 and a latitude coordinate axis 305. In one embodiment, each map tile 301 is made of multiple layers 307 including a feature detection model layer 309 for storing feature detection models and/or precomputed model weights or parameters generated using a training data set collected from a given map tile 301. Each map tile 301 can also include one or more other layers such as, but not limited to, a localization model layer 311 (e.g., storing data to aid in vehicle localization), a lane model layer 313 (e.g., storing data representing lanes that are present in a given map tile 301), a road model layer 315 (e.g., storing data on the geometry, attributes, etc. of roads that are present in a given map tile 301), and/or the like.

In one embodiment, embedding the feature detection model and/or model weights/parameters in the map tiles 301 or its layers would allow for the utilization of the map tile structure to deliver the specialized feature detection models and/or precomputed weights to in-vehicle feature detectors 105 as a part of prefetching map tiles required for a drive or other use by one or more systems of the vehicle 103. In other words, the system 100 can seamlessly deliver a feature detection models or model weights trained for a given geographic area (e.g., to achieve a more specific, compact, or efficient model) to an in-vehicle feature detector 105 when a map data or map tiles 301 of that given geographic area is delivered to the feature detector 105 or the corresponding vehicle 103. Once downloaded to a vehicle 103 (e.g., as part of fetching corresponding map tile 301), these models or sets of weights can be stored (e.g., as a part of a local cache of map tiles 301 maintained at the vehicle 103) and later used to adapt in-vehicle feature detectors 105 to new locations and/or operational conditions as the corresponding vehicle 103 travels to the new locations (e.g., by updating the model or model weights used by the in-vehicle feature detector 105 to correspond to the current location or operational condition).

As noted, in one embodiment, the system 100 can embed either or both feature detector models or the model weights or parameters. Embedding of feature detector models themselves enables the system 100 to dynamically adjust the net architectures of the models used in the in-vehicle feature detectors 105. For example, to add or alter detection classes, it is possible to dynamically add or replace deep neural network decoders or models that include the added or altered detection classes. Therefore, the system 100 can handle feature detection models or decoders the same way the system 100 handles model weights by precomputing per-tile models or decoders off-line in the cloud, storing them in a map layer, and then dispatching them dynamically for in-vehicle deployment as part of the map tile delivery pipeline. Embodiments of the model and/or model weight generation and delivery processes are described in further detail below with respect to FIGS. 4-8.

Figure 4:
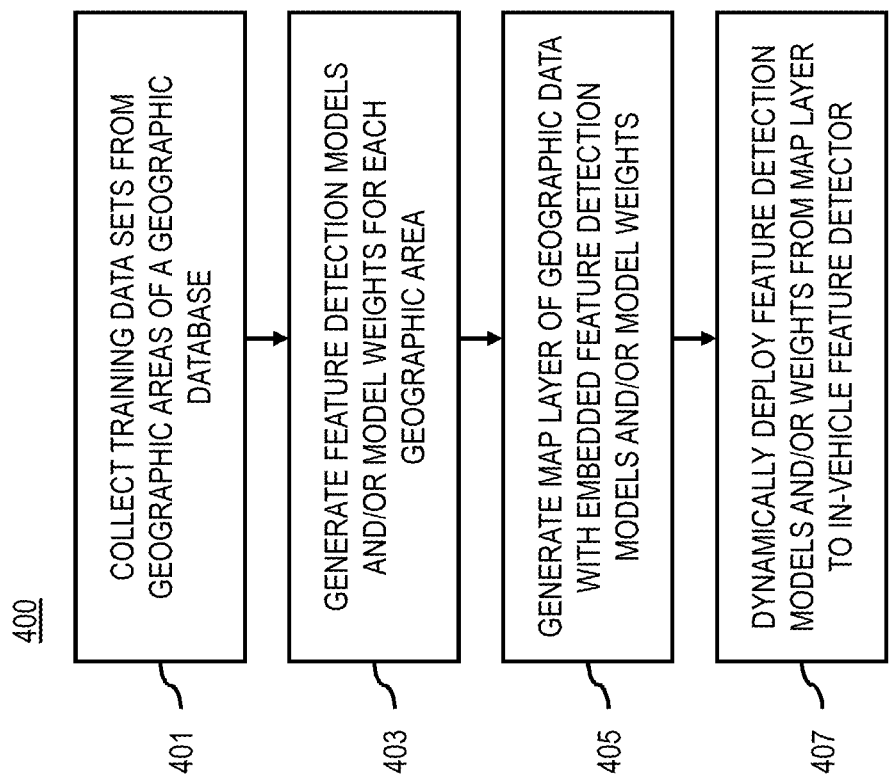
FIG. 4 is a flowchart of a process for generating a tile-based geographic database for dynamic adaptation of an in-vehicle feature detector, according to one embodiment.
Figure 10:
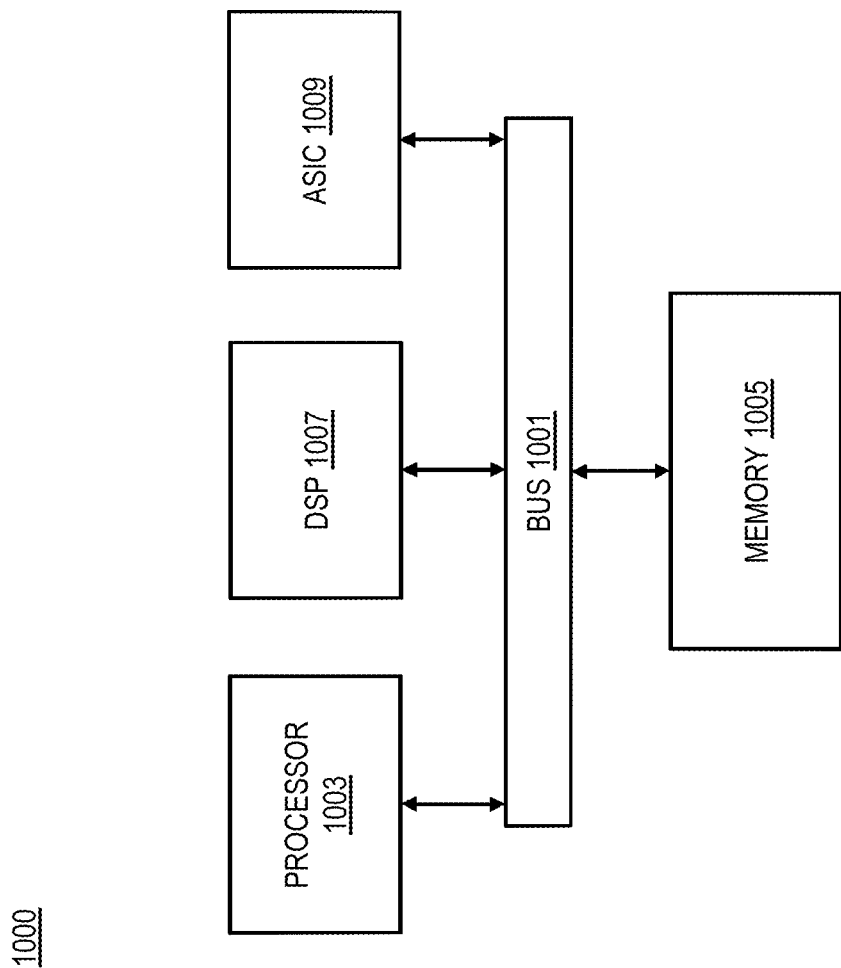
FIG. 10 is a diagram of a chip set that can be used to implement an embodiment.

FIG. 4 is a flowchart of a process for generating a tile-based geographic database for dynamic adaptation of an in-vehicle feature detector 105, according to one embodiment. In one embodiment, the mapping platform 113 may perform one or more portions of the process 400 and may be implemented in, for instance, a chip set including a processor and a memory as shown in FIG. 10. As such, the mapping platform 113 can provide means for accomplishing various parts of the process 400. In addition or alternatively, a services platform 115 and/or one or more services 117a-117n (also collectively referred to as services 117) may perform any combination of the steps of the process 400 in combination with the mapping platform 113, or as standalone components. Although the process 400 is illustrated and described as a sequence of steps, it is contemplated that various embodiments of the process 400 may be performed in any order or combination and need not include all of the illustrated steps.

As discussed above, autonomous, semi-autonomous, and/or HAD driving has quickly become an area of intense interest, with recent advances in machine learning, computer vision and computing power enabling real-time mapping and sensing of a vehicle 103's environment using an in-vehicle feature detector 105 in combination with HD maps (e.g., a tile-based geographic database 101). Such an understanding of the environment enables autonomous, semi-autonomous, or highly assisted driving in a vehicle 103 in at least two distinct ways.

First, real-time sensing of the environment provides information about potential obstacles, the behavior of others on the road, and safe, drivable areas. An understanding of where other cars are and what they might do is critical for a vehicle 103 to safely plan a route. Moreover, vehicles 103 generally must avoid both static (lamp posts, e.g.) and dynamic (cats, deer, e.g.) obstacles, and these obstacles may change or appear in real-time. More fundamentally, vehicles 103 can use a semantic understanding of what areas around them are navigable and safe for driving. Even in a situation where the world is completely mapped in high resolution, exceptions will occur in which a vehicle 103 might need to drive off the road to avoid a collision, or where a road's geometry or other map attributes like direction of travel have changed. In this case, detailed mapping may be unavailable, and the vehicle 103 has to navigate using real-time sensing of road features or obstacles based solely on its in-vehicle feature detector 105 (e.g., included as part of a computer vision system 111).

A second application of vision techniques in autonomous driving is localization of the vehicle 103 with respect to a map of reference landmarks stored in the geographic database 101. Understanding one's location on a map enables planning of a route, both on fine and coarse scales. On a coarse scale, navigation maps allow vehicles 103 to know what roads to use to reach a particular destination. However, on a finer scale, the geographic database 101 allows vehicles 103 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (e.g., ice, fog, potholes), and temporary road changes like construction.

With respect to lane localization and also generally with respect to autonomous driving, high accuracy and real-time localization of vehicles 103 are needed. Traditionally, most vehicle navigation systems accomplish this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 103 (e.g., an autonomous vehicle) so that it can make safe route planning decisions. Other sensors, such as inertial measurement units (IMUs) can increase the accuracy of localization by taking into account vehicle movement, but these sensors tend to drift and still do not provide sufficient accuracy for localization.

In general, a localization accuracy of around 10 cm is needed for safe driving in many areas. One way to achieve this level of accuracy is to use visual odometry, in which features are detected from imagery by in-vehicle feature detectors 105. These features can then be matched to the mapped features stored in the geographic database 10 to determine a current location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle 103 under different operational conditions (e.g., on different days in different weather conditions). Aside from reproducibility, the ability to detect and store higher level features of different types (e.g., lane features such as lane markings, lane lines, etc.) can provide better and more accurate localization. Accordingly, in one embodiment, the in-vehicle feature detector 105 can use feature detector models or decoders trained to detect such higher-level features on a region-specific basis as discussed with respect to the various embodiments described herein. The process 400 describes embodiments for generating such region-specific feature detection models and embedding them in the geographic database 101 for delivery to and dynamic adaptation of in-vehicle feature detectors 105.

To initiate the process 400, in step 401, the mapping platform 113 collects training data sets from geographic areas of the geographic database 101. The geographic areas correspond to discrete areas of the map of the geographic database 101 for which a region-specific or specialized feature detection model or set of model weights is to be generated. In one embodiment, the map data is organized into a tile-based structure, and the geographic area corresponds to one map tile of the tile-based structure. It is noted, however, that a map-tile is provided by way of example, and the embodiments described herein can use any other means to segment the geographic database 101 into discrete geographic areas for generating region-specific feature detection models and/or model weights.

Figure 5:
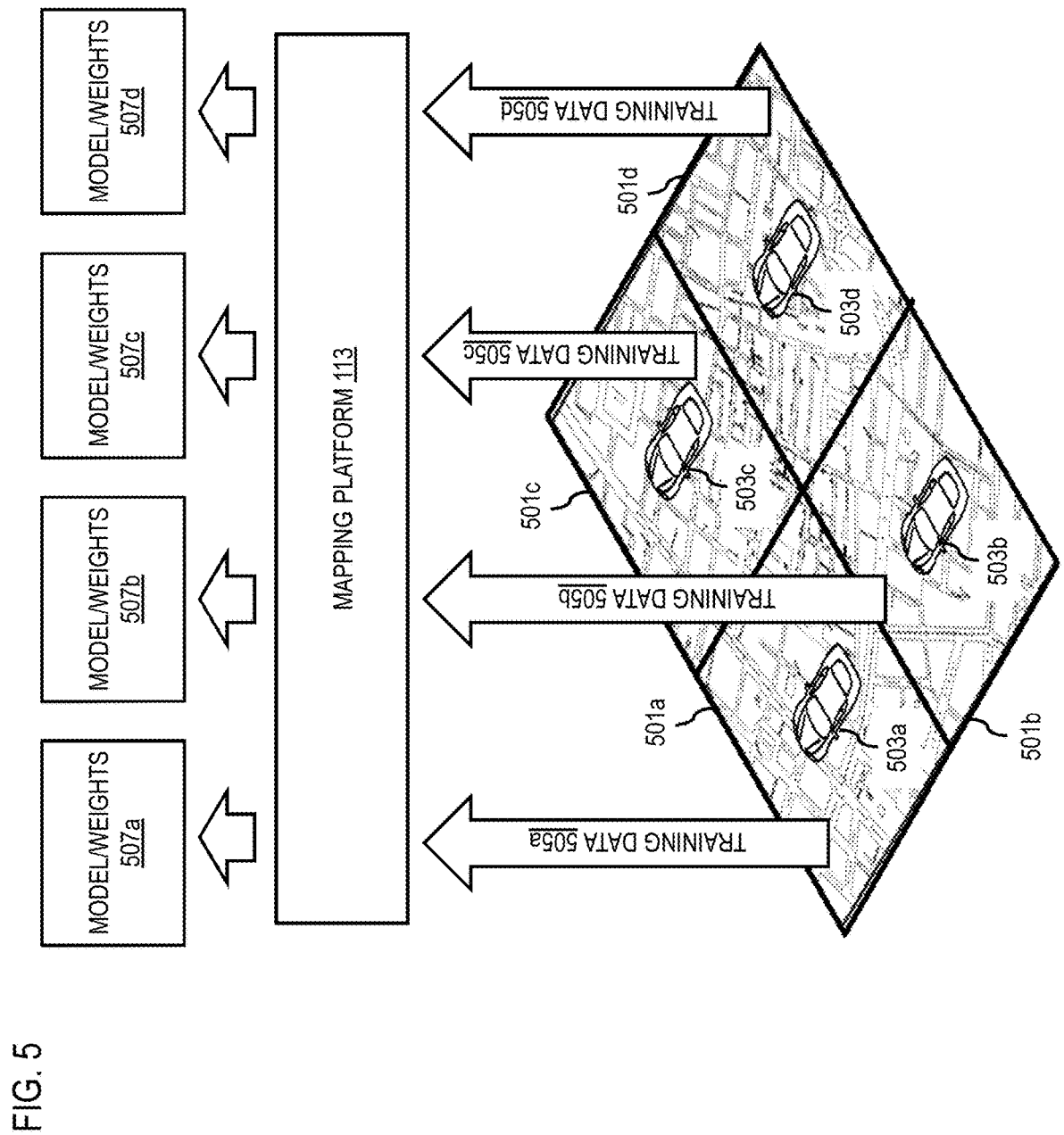
FIG. 5 is a diagram illustrating an example of collecting training data sets for generating a tile-based geographic database for dynamic adaptation of an in-vehicle feature detector, according to one embodiment.

FIG. 5 illustrates an example of collecting training data sets from a tile-based representation of a geographic area, according to one embodiment. In the example of FIG. 5, map tiles 501a-501d (also collectively referred to as map tiles 501) correspond to geographic areas mapped in the geographic database 101. In each of the map tiles 501, respective data collection vehicles 503a-503d (also collectively referred to as data collections vehicles 503 collect sensor data (e.g., imagery data, radar data, LiDAR data) as they travel within each respective map tile 501. The mapping platform 113 then collects the sensor data from each set of data collection vehicles 503 for each map tile 501 respectively as training data sets 505a-505b (also collectively referred to as training data sets 505). Each training data set 505 includes sensor readings or observations (e.g., images from onboard camera sensors) unique to each corresponding map tile.

After data collection, in step 403, the mapping platform 113 generates feature detection models, weights or parameters for the feature detection models, or a combination thereof as models/weights 507a-507d (also collectively referred as models/weights 507) from each of the corresponding training data sets 507. It is contemplated that any type of feature detection model (e.g., neural networks, support vector machines (SVM), decision trees, Random-Forest, etc.) can be used in the embodiments described herein. For example, convolutional neural networks have shown unprecedented ability to recognize objects in images, understand the semantic meaning of images, and segment images according to these semantic categories. Therefore, neural networks can be used by the in-vehicle feature detector 105 in combination with the computer vision system 111 to detect features for vehicle localization and other similar driving applications.

In one embodiment, the processing of the received training data sets 505 to generate per-tile models/weights 507 includes annotating the received training data sets 505 with one or more feature labels. The resulting labeled training data sets 505 represent, for instance, ground truth data for generating the respective models/weights 507. For example, with respect to a use case of feature detection from imagery data, the training or ground data truth data can include a set of images that have been manually marked or annotated with feature labels to indicate examples of the features or objects of interest. A manually marked feature that is an object (e.g., lane markings, road signs, etc.), for instance, can be a polygon or polyline representation of the feature that a human labeler has visually detected in the image. In one embodiment, the polygon, polyline, and/or other feature indicator can outline or indicate the pixels or areas of the image that the labeler designates as depicting the labeled feature.

In one embodiment, the mapping platform 113 can incorporate a supervised learning model (e.g., neural network, logistic regression model, RandomForest model, and/or any equivalent model) to provide feature matching probabilities or statistical patterns that are learned from the labeled training data sets 505 for each map tile 501. For example, during training, the mapping platform 113 uses a learner module that feeds feature sets from each individual training data set 505 into the feature detection model to compute a predicted matching feature using an initial set of model parameters (e.g., an initial set of model weights). The learner module then compares the predicted matching probability and the predicted feature to the ground truth data (e.g., the manually annotated feature labels) in the respective training data set 507. The learner module then computes an accuracy of the predictions for the initial set of model parameters or weights. If the accuracy or level of performance does not meet a threshold or configured level, the learner module incrementally adjusts the model parameters or weights until the model generates predictions at a desired or configured level of accuracy with respect to the manually annotated labels in each of the training data sets 507 (e.g., the ground truth data). This results in producing a respective model or set of weights 507 for each training data set 505, and correspondingly for each map tile 501 from which the training data set 505 was collected. In other words, a "trained" feature prediction model is a classifier with model parameters or weights adjusted to make accurate predictions with respect to the labeled sensor data set.

Figure 6:
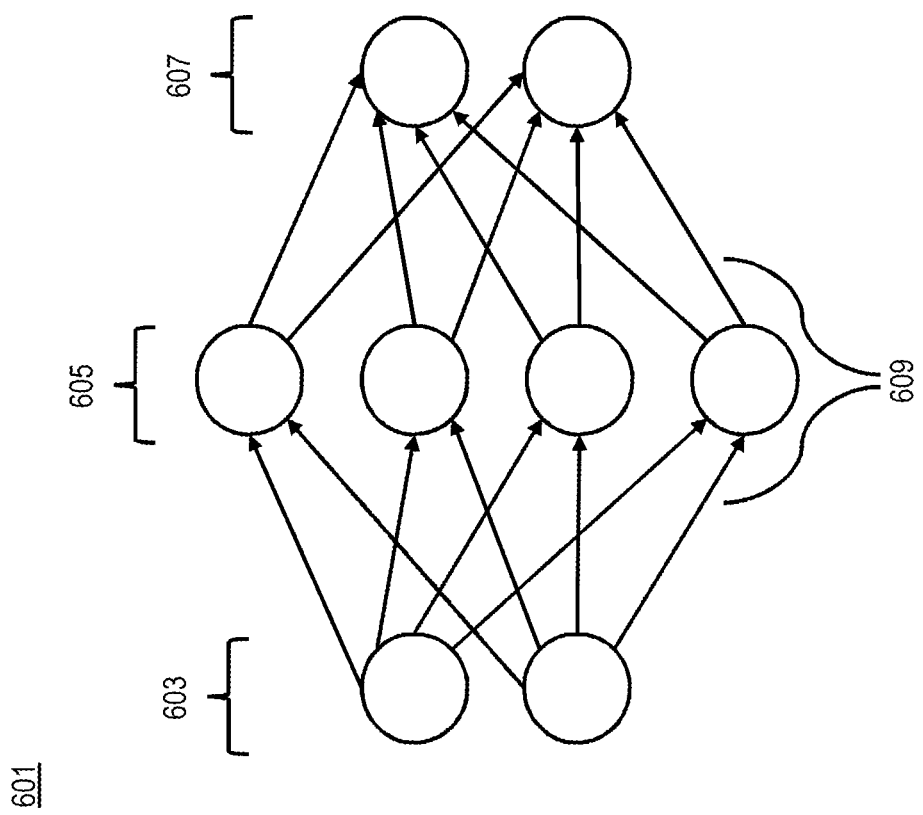
FIG. 6 is a diagram of an example of neural network and connection weights for dynamic adaptation of an in-vehicle feature detector, according to one embodiment.

FIG. 6 is a diagram of an example of neural network and connection weights for dynamic adaptation of an in-vehicle feature detector, according to one embodiment. In the example of FIG. 6, the feature detection model being trained is a neural network 601 including two nodes in an input layer 603, four nodes in a hidden layer 605, and two nodes in the output layer 607 (e.g., corresponding to two detection classes). Each of the nodes in one layer is connected to each other node in the next layer via one or more interconnections 609, and includes an activation function that is responds based on a respective weight values of each of the interconnections 609. After training, the set of weight values for all of the interconnections 609 represents the precomputed weights 507 corresponding to the respective training data set 505 on which the neural network 601 was trained. Continuing with the example of FIG. 5, each of the training data sets 505a-505d is used to train the neural network 601 separately to respectively generate weights 507a-507d that are specialized for each respective map tile 501a-501d.

As discussed above, the embodiments described herein are not limited to generating different sets of model weights, but can also be used to generate different feature detection models with different architectures. In other words, different numbers of input nodes, hidden nodes, or output nodes can be used depending on the training data sets 501 or other characteristics of the map tile 501. For example, in heterogenous geographic environments such as urban centers, there can be many more feature or objects of interests (e.g., different signs, lane markings, road types, etc.) than in a map tile including only rural highways. Therefore, additional detection classes can be supported by adding additional nodes in the output layer of the neural network. Like the model weights, these architectural differences can be pre-computed from the training data sets 505 for each respective map tile 501.

In one embodiment, the feature detection model, the precomputed weights, or a combination there can further based on one or more operational conditions of the in-vehicle feature detector 105, and/or the vehicle 103. By way of example, operational conditions can include, but are not limited to, environmental or contextual conditions (e.g., day versus night, weather, time of day, season, vehicle type, sensor type, etc.) that can potentially affect feature detection performance. To address this potential issue, the mapping platform 113 can collect training data under each operational condition of interest alone or in combination with the map tile geographic boundaries. This operational condition-based training data can then be used to train generate models and model weights on a per condition basis as described with respect to embodiments of training on a per-tile basis.

In step 405, the mapping platform 113 generates a map layer for one or more map tiles 501 of a tile-based geographic database 101 to store the generated feature detection model, precomputed weights for the feature detection model, or a combination thereof (e.g., models/weights 507) respectively for the one or more map tiles 501. For example, the mapping platform 113 embeds the feature detection model, precomputed weights for the feature detection model, or a combination thereof in a data layer of map data (e.g., the geographic database 101) representing a geographic area from which a respective training data set 505 was collected to generate the feature detection model, the precomputed weights, or a combination thereof. In one embodiment, the mapping platform 113 continue processing other map tiles in the geographic database 101 until all or designated map tiles 501 are processed. In other words, the mapping platform 113 embeds another feature detection model, other precomputed weights for the other feature detection model, or a combination thereof respectively in each map tile 5601 of the tile-based structure of the geographic database 101. This other feature detection model, other precomputed weights, or a combination are based on a respective training data set 505 collected from each map tile 501.

In step 407, the mapping platform 113 dynamically deploys the feature detection model, the precomputed weights, or a combination thereof to adapt an in-vehicle feature detector 105 based on determining that the in-vehicle feature detector is in the geographic area, plans to travel in the geographic area, or a combination thereof. In one embodiment, the dynamic deployment occurs as part of online delivering or streaming of map tile data to the vehicle 103. As a result, if the vehicle 103 has map tile data for a given location, the vehicle 103 will also have (e.g., in a layer of the map tile data) a corresponding specialized or region-specific feature detection model or weights best suited to detect features in the map tile while minimizing the feature detection model resource load on the in-vehicle feature detector 105.

Figure 7:
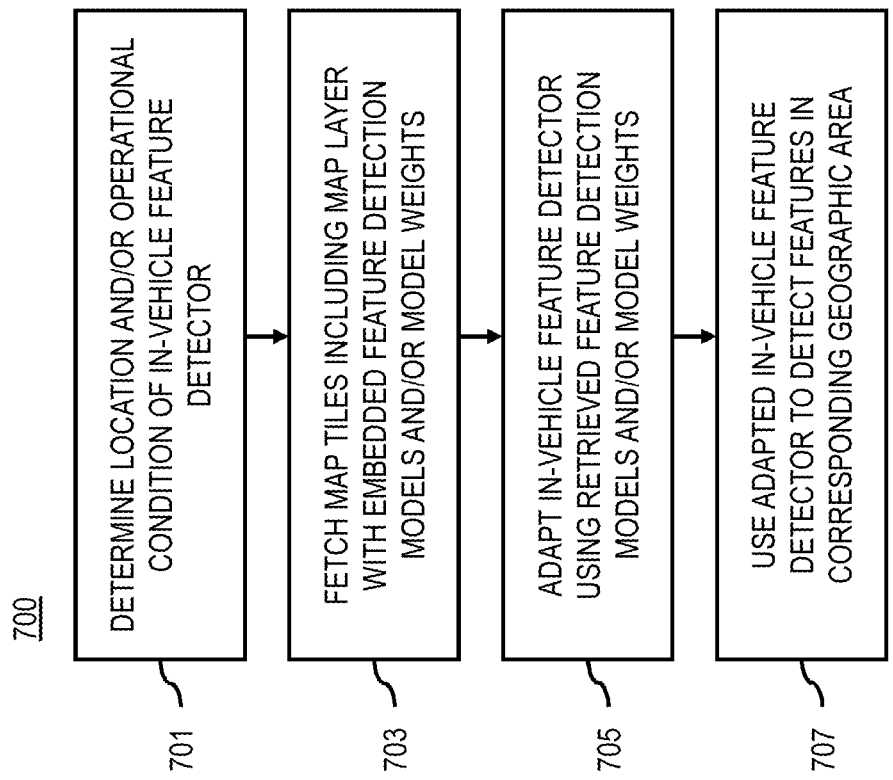
FIG. 7 is a flowchart of a process for dynamically adapting an in-vehicle feature detector based on a tile-based geographic database, according to one embodiment.

The dynamic adaption process from the perspective of the computer vision system 111 and/or in-vehicle feature detector 105 of the vehicle 103 is described with respect to FIG. 7, which is a flowchart of a process for dynamically adapting an in-vehicle feature detector based on a tile-based geographic database, according to one embodiment. In one embodiment, the computer vision system 111 and/or in-vehicle feature detector 105 may perform one or more portions of the process 700 and may be implemented in, for instance, a chip set including a processor and a memory as shown in FIG. 10. As such, the computer vision system 111 and/or in-vehicle feature detector 105 can provide means for accomplishing various parts of the process 700. In addition or alternatively, a user equipment (UE) device 119 (e.g., personal navigation device, mobile device, etc.), executing an application 121, may perform any combination of the steps of the process 700 alone or in combination with the computer vision system 111 and/or in-vehicle feature detector 105. Although the process 700 is illustrated and described as a sequence of steps, it is contemplated that various embodiments of the process 700 may be performed in any order or combination and need not include all of the illustrated steps.

As described above, the computer vision system 111 uses advances in machine learning, sensors, and data analytics to provide for greater environmental sensing and modeling to facilitate, for instance, autonomous driving. The computer vision system 111 includes an in-vehicle detector 105 that uses a feature detection model to process sensor data to detect road or other environmental conditions as the vehicle 103 travels. In-vehicle feature detectors 105 typically are compute resource constrained so that they traditionally had to compromise between prediction accuracy and generality. The dynamic adaption process 500 enables the in-vehicle feature detector 105 to avoid or reduce this compromise by providing specialized feature detection models and/or model weights on a per map-tile or per geographic area basis according to the embodiments described, for instance, in the process 400 of FIG. 4.

To initiate a dynamic adaption of the in-vehicle feature detector 105 on the vehicle 103 or client-side, in step 701, the computer vision system 111 or in-vehicle feature detector 105 determines a location and/or operational condition of the in-vehicle feature detector 105. For example, a current or expected location of the vehicle can be determined using, e.g., location sensors, planned locations, planned routes, inputs via a navigation device, etc. The map data corresponding to the current or expected map tiles can then be requested for delivery to the vehicle 103 (e.g., via a location based request to the mapping platform 113 and/or geographic database 101). Alternatively, in cases where, the entire geographic database 101 is pre-stored in the vehicle 103, all corresponding feature models and/or model weights also be pre-stored since they are contained in a data layer of the geographic database 101.

In step 703, the computer vision system 111 retrieves a map tile from a geographic database 101 (e.g., either from the geographic database online over a communication network 123, or from in-vehicle map storage or cache). As discussed previously, the retrieved map tile includes a data layer storing a feature detection model, precomputed weights for the feature detection model, or a combination thereof specialized for the geographic area corresponding to the map tile. By way of example, the feature detection model, the precomputed weights, or a combination thereof are generated using a training data set collected from a geographic area represented by the map tile. In addition, the feature detection model, the precomputed weights, or a combination thereof can be generated with respect to one or more operational conditions. In this way, the feature model or model weights corresponding to the current or expected operational condition can also be retrieved. In one embodiment, the retrieving of the map tile comprises pre-fetching the map tile based on a planned location, a planned route, or a combination thereof of the vehicle 103.

In step 705, the computer vision system 111 adapts an in-vehicle feature detector 105 with the feature detection model, the precomputed weights, or a combination thereof based on determining that the in-vehicle feature detector is in or expected to be in the geographic area. In one embodiment, adapting the in-vehicle feature detector 105 based the precomputed weights or parameters include updating the interconnection weights or parameters currently in used by a feature detection model of the in-vehicle feature detector 105 to the precomputed weights retrieved from the map tile data layer. Similarly, with respect to adapting the in-vehicle feature detector 105 based on the model includes replace the architecture or type of model currently in use with the feature detection model stored in the map tile data layer. In one embodiment, the adaptation is referred to as occurring "dynamically" because the change in model or model weights is automatically triggered by changes in location and/or operational condition of the vehicle 103, in-vehicle feature detector 105, and/or computer vision system 111.

In one embodiment, the computer vision system 111 stores the feature detection model, the precomputed weights, or a combination thereof in the at least one memory of the apparatus, the in-vehicle feature detector 105, or a combination thereof. The stored feature detection model, the stored precomputed weights, or a combination thereof are used to dynamically adjust the in-vehicle feature detector when the in-vehicle feature detector is in or expected to be in the geographic area. In this way, the specialized feature detection models or model weights can be stored (temporarily or permanently) until the triggering condition for their use is detected (e.g., detecting that the vehicle 103 has entered a map tile area and/or operational condition).

Once within the corresponding map tile area and/or operational condition, in step 707, the computer vision system 111 uses the adapted in-vehicle feature detector to process sensor data collected from the geographic area to detect one or more features.

Returning to FIG. 1, as shown, the system 100 includes the in-vehicle feature detector 105, computer vision system 111, and/or mapping platform 113 for providing dynamic adaptation of the in-vehicle feature detector 105 according the various embodiments described herein. In some use cases, with respect to autonomous, navigation, mapping, and/or other similar applications, the in-vehicle feature detector 105 can detect road features (e.g., lane lines, signs, etc.) in input sensor data and generate associated prediction confidence values (e.g., confidence metrics, uncertainty values, etc.), according to the various embodiments described herein. In one embodiment, the in-vehicle feature detector 105 and/or mapping platform 113 can include one or more feature detection models such as, but not limited to, neural networks, SVMs, decision trees, etc. to make feature predictions. For example, when the sensor data include images used for environment modeling, the features of interest can include lane lines in image data to support localization of, e.g., a vehicle 103 within the sensed environment. In one embodiment, the neural network of the system 100 is a traditional convolutional neural network which consists of multiple layers of collections of one or more neurons (e.g., processing nodes of the neural network) which are configured to process a portion of input sensor data. In one embodiment, the receptive fields of these collections of neurons (e.g., a receptive layer) can be configured to correspond to the area of the input sensor data.

In one embodiment, the in-vehicle feature detector 105 and/or mapping platform 113 also have connectivity or access to the geographic database 101 which stores representations of mapped geographic features to facilitate autonomous driving and/or other mapping/navigation-related applications or services. The geographic database 101 can also store specialized feature detection models and/or model weights in conjunction with map data according to the various embodiments described herein.

In one embodiment, the in-vehicle feature detector 105 and/or mapping platform 113 have connectivity over a communication network 123 to the services platform 115 that provides one or more services 117. By way of example, the services 117 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 117 uses the output of the in-vehicle feature detector 105 and/or mapping platform 113 (e.g., detected features) to model an environment of the vehicle 103, localize the vehicle 103 or UE 119 (e.g., a portable navigation device, smartphone, portable computer, tablet, etc.) to provide services 117 such as navigation, mapping, other location-based services, etc.

In one embodiment, the in-vehicle feature detector 105, computer vision system 111, and/or mapping platform 113 may be platforms with multiple interconnected components. The in-vehicle feature detector 105, computer vision system 111, and/or mapping platform 113 may include multiple servers, intelligent networking devices, computing devices, components and corresponding software for providing parametric representations of lane lines. In addition, it is noted that the in-vehicle feature detector 105, computer vision system 111, and/or mapping platform 113 may be a separate entity of the system 100, a part of the one or more services 117, a part of the services platform 115, or included within the UE 119 and/or vehicle 103.

In one embodiment, content providers 125a-125m (collectively referred to as content providers 125) may provide content or data (e.g., including geographic data, parametric representations of mapped features, etc.) to the geographic database 101, the in-vehicle feature detector 105, the mapping platform 113, the services platform 115, the services 117, the UE 119, the vehicle 103, and/or an application 121 executing on the UE 119. The content provided may be any type of content, such as map content, textual content, audio content, video content, image content, etc. In one embodiment, the content providers 125 may provide content that may aid in the detecting and classifying of lane lines and/or other features in image data, and estimating the quality of the detected features. In one embodiment, the content providers 125 may also store content associated with the geographic database 101, in-vehicle feature detector 105, mapping platform 113, services platform 115, services 117, UE 119, and/or vehicle 103. In another embodiment, the content providers 125 may manage access to a central repository of data, and offer a consistent, standard interface to data, such as a repository of the geographic database 101.

In one embodiment, the UE 119 and/or vehicle 103 may execute a software application 121 to collect, encode, and/or decode feature data detected in image data to select training observations for machine learning models according the embodiments described herein. By way of example, the application 121 may also be any type of application that is executable on the UE 119 and/or vehicle 103, such as autonomous driving applications, mapping applications, location-based service applications, navigation applications, content provisioning services, camera/imaging application, media player applications, social networking applications, calendar applications, and the like. In one embodiment, the application 121 may act as a client for the in-vehicle feature detector 105 and/or mapping platform 113 and perform one or more functions associated with in-vehicle data selection for feature detection model creation and maintenance.

By way of example, the UE 119 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 119 can support any type of interface to the user (such as "wearable" circuitry, etc.). In one embodiment, the UE 119 may be associated with the vehicle 103 or be a component part of the vehicle 103.

In one embodiment, the UE 119 and/or vehicle 103 are configured with various sensors for generating or collecting environmental sensor data (e.g., for processing by the in-vehicle feature detector 105 and/or mapping platform 113), related geographic data, etc. including but not limited to, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 119 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 119 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 119 and/or vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 123 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the in-vehicle feature detector 105, mapping platform 113, services platform 115, services 117, UE 119, vehicle 103, and/or content providers 125 communicate with each other and other components of the system 100 using well known, new or still developing protocols. In this context, a protocol includes a set of rules defining how the network nodes within the communication network 123 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
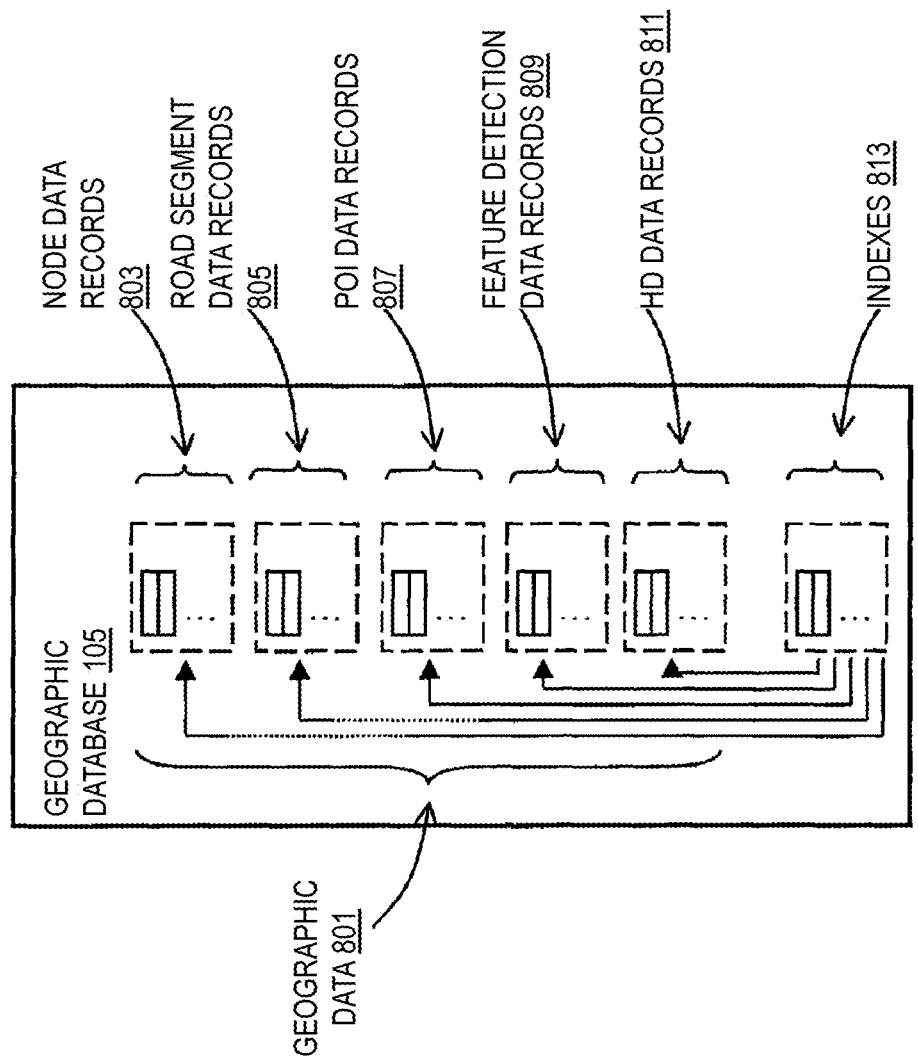
FIG. 8 is a diagram of a geographic database, according to one embodiment.

FIG. 8 is a diagram of a geographic database, according to one embodiment. In one embodiment, the geographic database 101 includes geographic data 801 used for (or configured to be compiled to be used for) mapping and/or navigation-related services, such as for video odometry based on the parametric representation of lanes include, e.g., encoding and/or decoding parametric representations into lane lines. In one embodiment, the geographic database 101 include high resolution or high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 811) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 101 is stored as a hierarchical or multilevel tile-based projection or structure. More specifically, in one embodiment, the geographic database 101 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 101 includes node data records 803, road segment or link data records 805, POI data records 807, feature detection data records 809, HD mapping data records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 101. In one embodiment, the indexes 813 may be used to quickly locate data without having to search every row in the geographic database 101 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 807. The geographic database 101 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 101 can also include feature detection data records 809 for training data, region-specific feature detection models, pre-computed model weights or parameters, annotated observations, computed featured distributions, sampling probabilities, and/or any other data generated or used by the system 100 according to the various embodiments described herein. By way of example, the feature detection data records 809 can be associated with one or more of the node records 803, road segment records 805, and/or POI data records 807 to support localization or visual odometry based on the features stored therein and the corresponding estimated quality of the features. In this way, the records 809 can also be associated with or used to classify the characteristics or metadata of the corresponding records 803, 805, and/or 807. In one embodiment, the feature detection data records 809 are stored as a data layer of the hierarchical tile-based structure of the geographic database 101 according to the various embodiments described herein. In one embodiment, the geographic database 101 can provide the tile-based feature detection data records 809 to dynamic adaptation of the in-vehicle feature detector 105.

In one embodiment, as discussed above, the HD mapping data records 811 model road surfaces and other map features to centimeter-level or better accuracy. The HD mapping data records 811 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 811 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 811 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 811.

In one embodiment, the HD mapping data records 811 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 101 can be maintained by the content provider 125 in association with the services platform 115 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle (e.g., vehicle 103 and/or UE 119) along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 103 or UE 119. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing dynamic adaptation of the in-vehicle feature detector 105 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
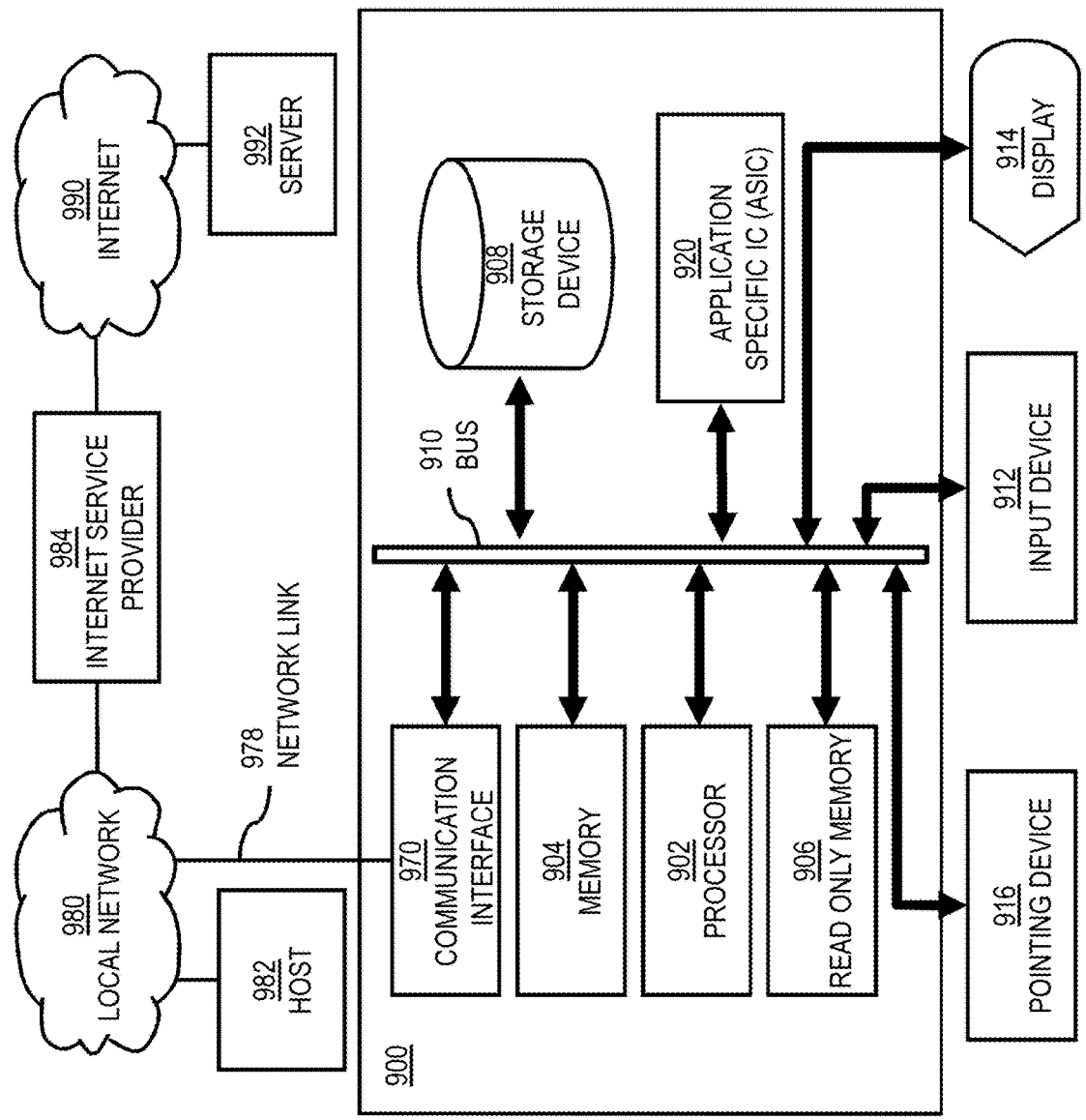
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to provide dynamic adaptation of the in-vehicle feature detector 105 as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to providing dynamic adaptation of the in-vehicle feature detector 105. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for providing dynamic adaptation of the in-vehicle feature detector 105. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for providing dynamic adaptation of the in-vehicle feature detector 105, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 123 for providing dynamic adaptation of the in-vehicle feature detector 105.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to provide dynamic adaptation of the in-vehicle feature detector 105 as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to provide dynamic adaptation of the in-vehicle feature detector 105. The memory 1005 also stores the data associated with or generated by the execution of the inventive steps.

Figure 11:
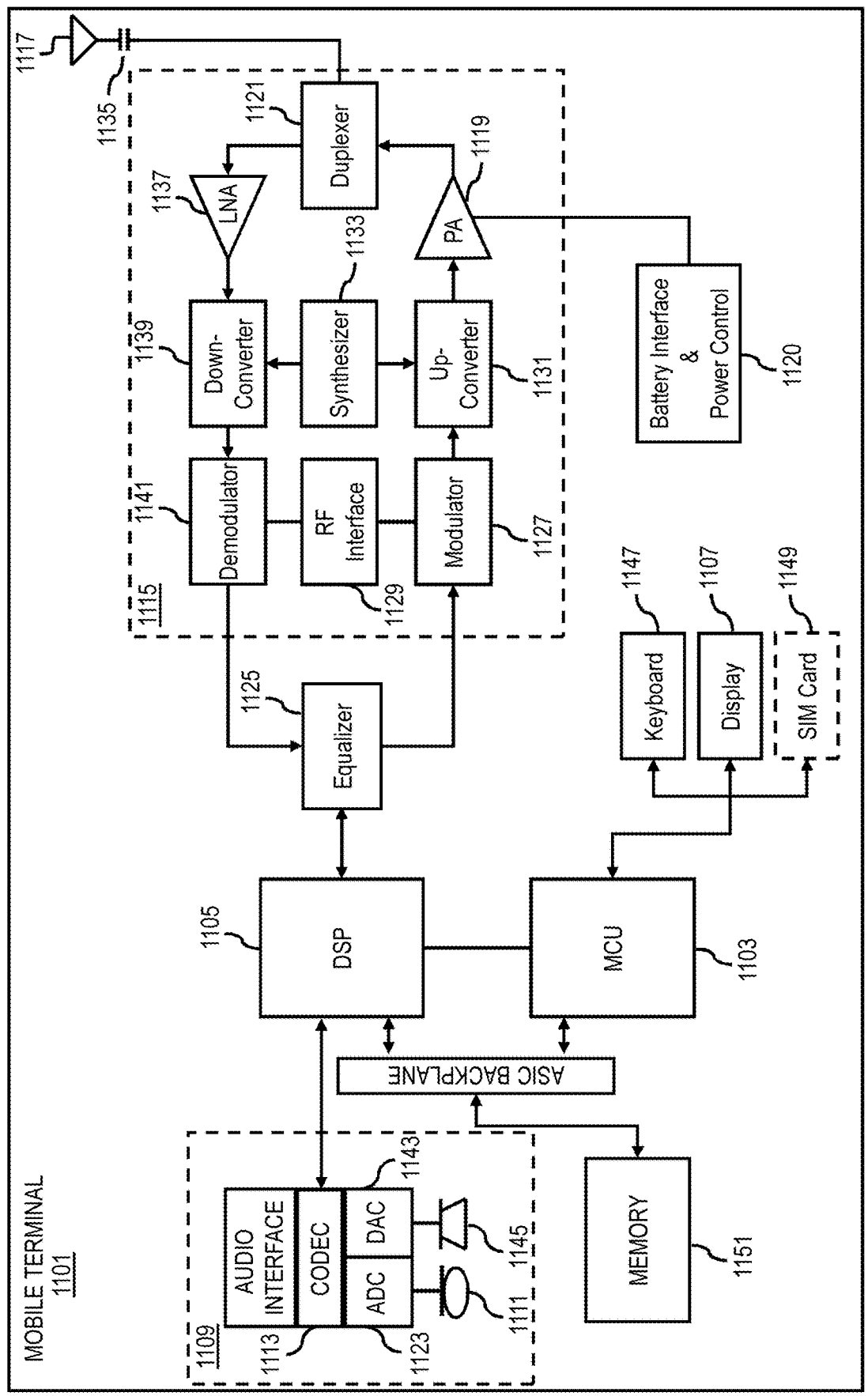
FIG. 11 is a diagram of a mobile terminal (e.g., handset) that can be used to implement an embodiment.

FIG. 11 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to provide dynamic adaptation of the in-vehicle feature detector 105. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
embedding, by a processor, a feature detection model, precomputed weights for the feature detection model, or a combination thereof in a data layer of map data representing a geographic area from which a training data set was collected to generate the feature detection model, the precomputed weights, or a combination thereof; and
deploying the feature detection model, the precomputed weights, or a combination thereof to adapt an in-vehicle feature detector based on determining that the in-vehicle feature detector is in the geographic area, plans to travel in the geographic area, or a combination thereof.

2. The method of claim 1, wherein the in-vehicle feature detector uses the feature detection model, the precomputed weights, or a combination thereof to process sensor data collected while in the geographic area to detect one or more features.

3. The method of claim 1, wherein the map data is organized into a tile-based structure, and wherein the geographic area corresponds to one map tile of the tile-based structure.

4. The method of claim 1, further comprising:
embedding another feature detection model, other precomputed weights for the another feature detection model, or a combination thereof respectively in each map tile of the tile-based structure,
wherein the another feature detection model, the other precomputed weights, or a combination are based on a respective training data set collected from said each map tile.

5. The method of claim 1, wherein the feature detection model, the precomputed weights, or a combination there are further based on one or more operational conditions of the in-vehicle feature detector, and wherein the deploying of the feature detection model, the precomputed weights, or a combination thereof is further based on determining that the in-vehicle feature detector is operating or expected to operate under the one or more operational conditions.

6. The method of claim 1, wherein one or more detection classes of the feature detection model are further based on the training data set collected from the geographic area.

7. The method of claim 1, wherein the feature detection model, the precomputed weights, or a combination thereof are embedded in a data layer of the map data.

8. The method of claim 1, wherein the feature detection model, the precomputed weights, or a combination thereof are determined in an offline mode; and wherein the deploying of the feature detection model, the precomputed weights, or a combination thereof is performed dynamically in an online mode.

9. The method of claim 1, wherein the in-vehicle feature detector is part of computer vision system of a vehicle.

10. An apparatus comprising:
at least one processor; and
at least one memory including computer program code for one or more programs,
the at least one memory and the computer program code configured to, with the at least one processor, cause the apparatus to perform at least the following,
retrieve a map tile from a geographic database, wherein the map tile includes a data layer storing a feature detection model, precomputed weights for the feature detection model, or a combination thereof; and wherein the feature detection model, the precomputed weights, or a combination thereof are generated using a training data set collected from a geographic area represented by the map tile; and
adapt an in-vehicle feature detector with the feature detection model, the precomputed weights, or a combination thereof based on determining that the in-vehicle feature detector is in or expected to be in the geographic area,
wherein the adapted in-vehicle feature detector is used to process sensor data collected from the geographic area to detect one or more features.

11. The apparatus of claim 10, wherein the retrieving of the map tile comprises pre-fetching the map tile based on a planned location, a planned route, or a combination thereof of a vehicle equipped with the in-vehicle feature detector.

12. The apparatus of claim 10, wherein the apparatus is caused to:
store the feature detection model, the precomputed weights, or a combination thereof in the at least one memory of the apparatus, another memory of the in-vehicle feature detector, or a combination thereof.

13. The apparatus of claim 12, wherein the stored feature detection model, the stored precomputed weights, or a combination thereof are used to dynamically adjust the in-vehicle feature detector when the in-vehicle feature detector is in or expected to be in the geographic area.

14. The apparatus of claim 10, wherein the map tile is among a plurality of map tiles of the geographic database, wherein each of the plurality of map tiles includes a respective data layer comprising a respective feature detection model, respective precomputed weights of the respective feature detection model, or a combination thereof.

15. The apparatus of claim 10, wherein the feature detection model, the precomputed weights, or a combination thereof are generated with respect to one or more operational conditions, and wherein the in-vehicle feature detector is configured with the feature detection model, the precomputed weights, or a combination thereof when the in-vehicle feature detector is operating or expected to operate under the one or more operational conditions.

16. A non-transitory computer-readable storage medium carrying one or more sequences of one or more instructions which, when executed by one or more processors, cause an apparatus to perform:
generating a map layer for one or more map tiles of a tile-based geographic database, the map layer storing a feature detection model, precomputed weights for the feature detection model, or a combination thereof respectively for the one or more map tiles,
wherein the feature detection model, the precomputed weights, or a combination thereof are generated from a training data set respectively from the one or more map tiles; and
wherein the feature detection model, the precomputed weights, or a combination thereof are dynamically deployed to an in-vehicle feature detector in response to a location-based request for the one or more map tiles.

17. The non-transitory computer-readable storage medium of claim 16, wherein the precomputed weights are calculated during an offline training of the feature model using the training data set.

18. The non-transitory computer-readable storage medium of claim 17, wherein the feature detection model is a neural network, and wherein the precomputed weights are associated with a plurality of connections among a plurality of interconnected processing elements of the neural network.

19. The non-transitory computer-readable storage medium of claim 16, wherein one or more detection classes of the feature detection model are further based on the training data set collected from the geographic area.

20. The non-transitory computer-readable storage medium of claim 16, wherein the in-vehicle feature detector uses the feature detection model, the precomputed weights, or a combination thereof corresponding to a map tile in which the in-vehicle feature detector is located or expected to be located.

\* \* \* \* \*